United States Patent [19]
Ahmed

[11] Patent Number: 5,293,713
[45] Date of Patent: Mar. 15, 1994

[54] DEVICE FOR SUPPORTING CUT FLOWERS

[76] Inventor: Hassen J. Ahmed, 125 Winding Rd., Irmo, S.C. 29063

[21] Appl. No.: 948,145
[22] Filed: Sep. 21, 1992
[51] Int. Cl.$^5$ ............................................. A01G 5/00
[52] U.S. Cl. ....................................... 47/55; 24/561; 47/41.01
[58] Field of Search ................... 47/55, 42, 41.01, 44; 24/555, 563, 561, 562

[56] References Cited

U.S. PATENT DOCUMENTS

| | | |
|---|---|---|
| 298,381 | 5/1884 | Holden .................. 24/563 |
| 324,294 | 8/1885 | Brothwell .............. 24/555 |
| 716,668 | 12/1902 | Cheney . |
| 1,044,260 | 11/1912 | Schloss . |
| 1,229,312 | 6/1917 | Newhouse ............ 24/563 |
| 1,446,563 | 2/1923 | Hughes . |
| 1,686,678 | 10/1928 | Burke .................... 24/555 |
| 1,936,824 | 6/1934 | Cassedy . |
| 2,247,191 | 6/1941 | Endres . |
| 2,904,932 | 9/1959 | Seewann . |
| 3,010,256 | 11/1961 | Ise ........................... 47/42 |
| 3,271,922 | 9/1966 | Wallerstein et al. . |
| 3,309,258 | 3/1967 | Gallo ................... 47/41.01 |
| 3,381,883 | 5/1968 | Harris ..................... 24/562 |
| 3,657,840 | 4/1972 | Benoist . |
| 3,767,104 | 10/1973 | Bachman et al. . |
| 4,095,608 | 6/1978 | Holmes .................. 24/561 |
| 4,434,535 | 3/1984 | Woodley ................ 24/562 |
| 5,018,260 | 5/1991 | Ziu ......................... 24/555 |
| 5,060,417 | 10/1991 | Court . |

FOREIGN PATENT DOCUMENTS

| | | | |
|---|---|---|---|
| 1527581 | 5/1968 | France ................... 24/561 |
| 0195134 | 4/1938 | Switzerland ........... 24/555 |
| 1053783 | 11/1983 | U.S.S.R. ................ 47/44 |
| 1528381 | 12/1989 | U.S.S.R. ................ 47/44 |

Primary Examiner—Ramon S. Britts
Assistant Examiner—Joanne C. Downs
Attorney, Agent, or Firm—Michael A. Mann

[57] ABSTRACT

A device for supporting cut flowers. The device is in the form of a hollow tube with a longitudinal opening formed therein. The edges of the tube at the opening carry flanges, disposed at an angle with respect to one another of at least 30° and flaring outwardly from the tube. The interior surface of the tube has longitudinal ridges, preferably three ridges, that engage the flower stem and add stiffening to the tube for better support. The ridges also define channels between the stem and the interior surface of the tube for air to circulate and the stem to breathe. The device is fitted to the stem of a cut flower, just below the base of the flower head, to prevent drooping and wilting. It can be installed on a variety of cut flowers without damaging the stem.

13 Claims, 2 Drawing Sheets

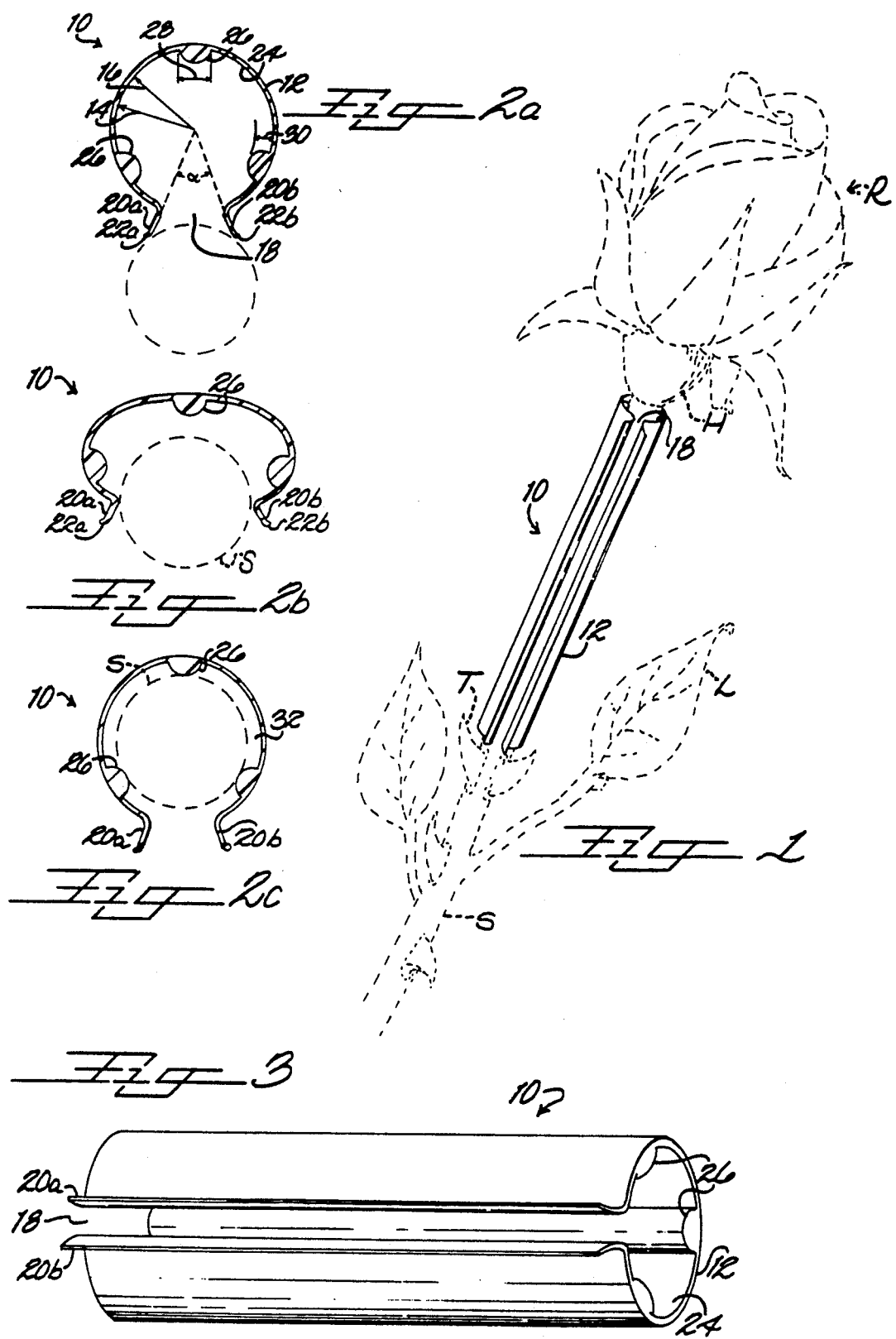

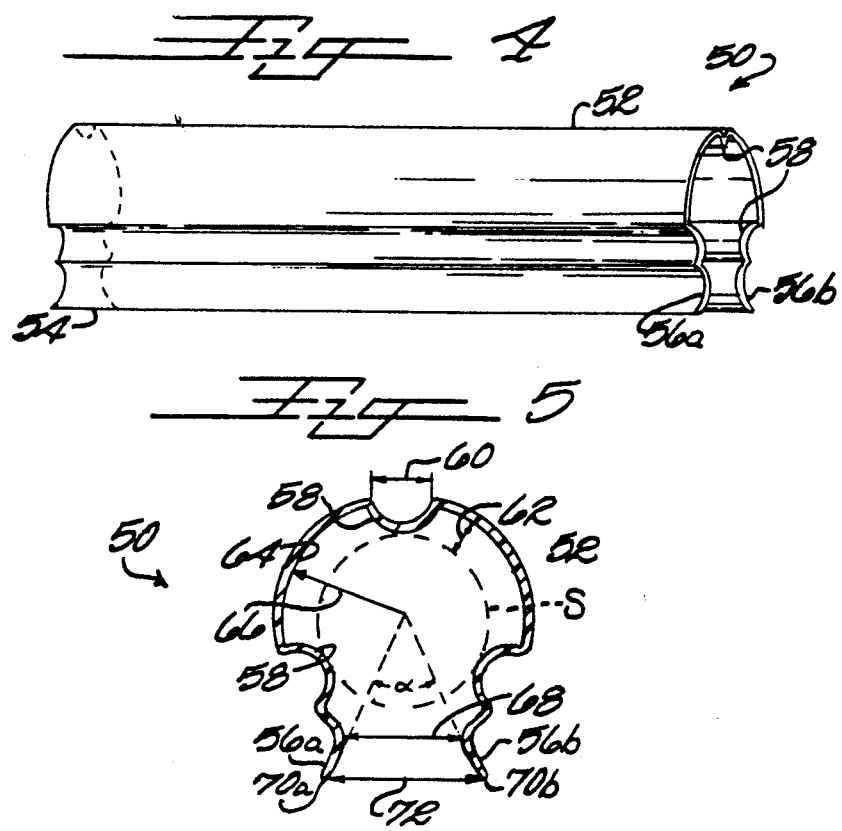

DEVICE FOR SUPPORTING CUT FLOWERS

BACKGROUND OF THE INVENTION

1. Field of the Invention

The present invention relates generally to floriculture. In particular, the present invention relates to a device and method for supporting the stems and heads of cut flowers.

2. Discussion of Background

The flower industry is a multi-billion dollar industry worldwide. In the U.S. alone, sales of cut roses exceed $300 million dollars per year. The most popular varieties of rose, including specialty roses such as the MADAME DELBARD, often retail for several dollars per rose. Sales of other cut flowers are also substantial.

Flowers start to wilt just a few hours after cutting unless they are supplied with water and nutrients. In retail florist shops, cut flowers are often stored under high humidity and carefully controlled temperatures to help preserve the blooms, extending their useful lives from one to two weeks. After purchase, however, the life span of cut flowers may be as little as a few days.

Many techniques are available for extending the useful life of cut flowers, including changing their water regularly, adding preservatives to the water, trimming the stems, keeping the flowers away from direct sunlight, and refrigerating them overnight. Even when such precautions are taken, cut flowers start to wilt after a few days.

The first indication of wilting is when the stem starts to bend just below the flower head. As the stem bends, the flower head droops and the flow of water up the stem is impeded. Soon afterwards, the flower petals start to discolor and the flower dies. Retail florists often use steel floral wire to support the fresh flower stem, thereby preventing drooping and facilitating continued water flow up the stem. This technique is often used to extend the useful life of arrangements of flowers such as roses and carnations.

When a cut flower is wired, one end of the wire is inserted into the flower hip and the wire is wrapped around the stem. In the process of applying the wire the flower hip is punctured and some of the foliage is damaged. The metal wire may interact with the plant fluids, creating acidic byproducts which shorten the life of the cut flower. In addition, the wire does not provide full support to the flower head. Floral wire is normally sold in fixed lengths, so that for short stems the wire must be cut and a portion discarded. Wiring is time-consuming and requires a considerable degree of skill. Even an experienced florist discards some flowers that are visibly damaged in the process of wiring.

In the case of a rose, the stem is stripped of thorns before the wire is applied. In addition to being time consuming, stripping frequently damages the outer skin of the stem. This results in reduced water intake and premature wilting, off-setting to some extent the beneficial effect of supporting the flower head to prevent drooping. A damaged stem also diminishes the natural beauty of the rose.

A number of devices are available for supporting cut flowers. For example, a spacing disc for a conical paper flower container has a plurality of spaced tear-shaped openings for holding flower stems (Bachman, et al., U.S. Pat. No. 3,767,104). Flowers can be fixed to a continuous strip, which is then rolled in such a fashion that the flowers are isolated from one another to facilitate storage and transport (Benoist, U.S. Pat. No. 3,657,840). Holders for cut flowers include a flexible paper cover for protecting the petals (Wallerstein, et al., U.S. Pat. No. 3,271,922), a cardboard sleeve for receiving the stems (Endres, U.S. Pat. No. 2,247,191), and a waterproof wrapper for corsage stems (Schloss, U.S. Pat. No. 1,044,260). None of these devices provides support for individual stems and flower heads.

A stem and head support for cut flowers is described by Court in U.S. Pat. No. 5,060,417. The device includes a tubular structure for gripping the stem and including an enlarged portion for holding the flower head. The Court device is produced by injection molding. An individual consumer might purchase several such devices for a flower arrangement, planning to salvage the devices and save them for re-use in another arrangements. When used by a retail florist on a one-time basis, the device can easily add 10%-20% to the price of a single rose, a significant increase to many customers. Furthermore, the edges of the opening of the device can damage a flower stem as it is inserted.

There is a need for a simple, easy-to-use support for cut flowers. The support should not damage the stem or flower head when installed. It should hold the stem firmly, allow air and water to contact the stem, and be simple and inexpensive to manufacture.

SUMMARY OF THE INVENTION

According to its major aspects and broadly stated, the present invention is a clip for supporting cut flowers. The clip is in the form of a hollow tube with a flanged, longitudinal opening formed therein. The flanges are disposed at an angle with respect to each other so that they flare outwardly. The interior surface of the tube carries at least one, and preferably three or more longitudinal ridges.

The clip is applied to the stem just below the flower hip, in an area that is usually free of foliage or thorns. To use the clip, the florist places it at the desired position along the cut stem of a flower, then gently pushes a portion of the stem into one end of the clip. The stem pushes the flanges apart as it enters the tube. Once a portion of the stem is inserted, the florist pushes the remaining portions of stem into the clip.

The clip supports the stem and facilitates transportation of water and nutrients up the stem, thereby extending the useful life of the flower. The clip can be easily and rapidly installed on a variety of cut flowers without damaging their stems. The clip may be applied to different species of flowers, such as roses, carnations, daisies, tulips, and the like, and can be installed without removing foliage or thorns from the stem thereby reducing the time involved in preparing flowers for sale and avoiding damage to stems.

An important feature of the present invention is the tube. The tube supports the stem of the cut flower against transverse forces but is resilient and flexible when the stem is pushed through the flanges. The tube is preferably made of plastic and extruded, rather than injection molded, resulting in low manufacturing cost. The tube is preferably dimensioned to fit a wide range of cut flowers.

Another feature of the present invention is the flanges. By flaring outwardly, the flanges slide around the stem and guide the stem as the stem is pushing through the opening. The flanges thus facilitate installation of the clip to the flower stem but avoid damage to the skin in the installation process.

Still another feature of the present invention is the ridges. The interior surface of the clip bears at least one, and preferably three longitudinal ridges. The ridges engage the stem of the flower at discrete intervals about its circumference, leaving gaps or channels elsewhere on the interior surface of the tube for transpiration and air circulation generally. The ridges add stiffening to the tube against transverse forces and create annular channels between the stem and the interior surface of the tube. The channels help extend the useful life of the flower by allowing air to flow through the interior of the clip so the stem can "breathe." If a portion of the clip is immersed in water, the channels also allow water to contact that portion of the stem.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of a device according to a preferred embodiment of the present invention;

FIG. 2a is a cross-sectional view of the device shown in FIG. 1 with a cross section of a flower stem shown outside the device;

FIG. 2b is the device of FIG. 2a, with the flower stem partially inserted;

FIG. 2c is the device of FIG. 2a, with the flower stem fully inserted;

FIG. 3 is a perspective view of a device according to a preferred embodiment of the present invention;

FIG. 4 is a perspective view of an alternative preferred embodiment of a device according to the present invention; and FIG. 5 is a cross-sectional view of the device of FIG. 4.

DETAILED DESCRIPTION OF A PREFERRED EMBODIMENT

Roses typically have a 5" (about 12.7 cm) or longer length of stem that is substantially free of leaves and thorns, just below the hip. The stems of many other flowers also are foliage-free along a portion of their stems just below the flower head. As shown in FIG. 1, a clip 10 according to the present invention can be applied to flower such as a rose R for support at this critical location where wilting occurs. Clip 10 is in the form of a hollow tube 12 with a longitudinal opening 18 formed therein.

Referring in particular to FIG. 2a, there is shown a cross-sectional view of a device according to a preferred embodiment of the present invention. Tube 12 has outer radius 14 and inner radius 16. The opposing, spaced-apart edges of opening 18 bear flanges 20a, 20b, disposed at an angle, a, with respect to each other so that they flare outwardly. Flanges 20a, 20b have ends 22a, 22b. The interior surface 24 of tube 12 bears at least one, and preferably three longitudinal ridges 26 (FIG. 3). Ridges 26 have width 28 and are convex, that is, they extend inwardly a depth 30 from interior surface 24.

The process of inserting a flower stem into clip 10 is illustrated in FIGS. 2a–2c. Initially, the stem, shown as phantom image S, is outside the clip (FIG. 2a). The florist places clip 10 at the desired position along the cut stem, then gently pushes a portion of stem S into one end of clip 10, pushing flanges 20a, 20b apart and increasing the width of opening 18 (FIG. 2b). Once a portion of stem S is inserted, the florist progressively pushes the remaining section of stem S into clip 10. Flanges 20a, 20b engage stem S and guide it into clip 10, thereby facilitating insertion of the stem into clip 10 (FIG. 2c).

Ridges 26 extend inwards from interior surface 24 of tube 12 to engage stem S. The combination of stem S and ridges 26 results in gaps or channels 32 between stem S and tube 12 (FIG. 2c). Channels 32, which extend the length of tube 12, allow air to flow through the interior of clip 10, so stem S can "breathe," thereby helping extend the useful life of the flower. If some portion of the length of clip 10 is immersed in water, channels 32 also allow water to contact that portion of stem S.

FIG. 1 is a perspective view of a clip according to the present invention installed on a rose (shown in phantom image). (Although illustrated for use with roses, it will be understood that clip 10 can be used to support a variety of flowers, those with thorns and those without. The clip ideally is long enough to fit between the base or hip of the flower and the first foliage, meaning branchlet, leaf, or thorn below the flower base.) Rose R has hip H, and stem S bearing foliage in the form of thorns T and leaves L. Clip 10 is positioned between hip H and the closest foliage thereto (uppermost thorn T), typically about five inches on a MADAME DELBARD rose, with the upper end of clip 10 just below hip H so that the clip supports stem S. Clip 10 prevents stem S from bending so that water and nutrients can better be transported up stem S, thus prolonging the useful life of rose R.

Clip 10 may be substantially cylindrical with an approximately circular cross-section, as illustrated in FIG. 2a, or have some other convenient cross-section. Clip 10 is made of a flexible, resilient material such as plastic that provides longitudinal support against forces applied in the transverse direction but flexible and resilient to allow easy opening and placement of a cut flower stem when flanges 20a, 20b are spread. By "transverse direction", it is meant that the forces perpendicular to the long dimension of clip 10 are resisted. Clip 10 is manufactured by any convenient process including injection molding and extrusion molding. Preferably, clip 10 is manufactured by extrusion molding, resulting in a low manufacturing cost. If desired, the color of clip 10 is chosen to blend with the color of the flower stem. Thus, the material may be transparent or translucent, or tinted green to match the color of many flower stems.

Clip 10 is preferably dimensioned such that a single size will fit a wide range of cut flowers. While the dimensions may vary without departing from the spirit of the present invention, inner radius 16 is preferably in the range of approximately 0.1"–0.15" (2.5 mm–4.0 mm). The wall of tube 12 is approximately 0.004"–0.010" (0.10 mm–0.25 mm) thick, preferably about 0.006" (0.15 mm). Width 28 of ridges 26 is approximately 0.02"–0.06" (0.5 mm–1.5 mm), most preferably 0.04" (1.0 mm). Depth 30 is approximately 0.02"–0.06" (0.5 mm–1.5 mm), most preferably approximately 0.04" (1 mm).

Flanges 20a, 20b preferably extend outwardly at an angle from opening 18. If flanges 20a, 20b were absent, the edges of opening 18 could scrape the surface of flower stem S as the stem is inserted into clip 10, possibly damaging the surface and shortening the life of the flower. Similarly, if flanges 20a, 20b were parallel to one another, their ends 22a, 22b could scrape stem S during insertion. As best seen in FIG. 2b, angled flanges 20a, 20b part as stem S is inserted into opening 18, engaging the surface of stem S and guiding the stem through opening 18. Ends 22a, 22b are oriented away from opening 18 and stem S, so that the stem contacts only a smooth surface during insertion, thereby helping prevent damage to the stem. Flanges 20a, 20b are formed at an angle, a, to one another, with a being at least approximately 30° and preferably in the range of approximately 30° to 60°. An angle of at least 30° will result in flanges 20a, 20b meeting a typical stem with a significant tangential component that the flanges will be spread apart by the stem rather than dig into or be closed by the stem. Flanges 20a, 20b are approximately 0.04"–0.06" (1.0 mm–1.5 mm) long. It will be understood that the optimum length of flanges 20a, 20b may vary with the length of tube 12.

Ridges 26 may be approximately semicircular in cross-section and evenly spaced along the perimeter of tube 12, as illustrated in FIGS. 2a-c and 3, or some other form that is convenient to manufacture. Three ridges 26 are shown, however, clip 10 may be furnished with any desired number of ridges.

Referring now to FIGS. 4 and 5, there is shown an alternative preferred embodiment of a device according to the present invention. Clip 50 is in the form of a hollow tube 52 with longitudinal opening 54 formed therein. Opening 54 bears opposing flanges 56a, 56b, disposed at an angle, a, with respect to each other so that they flare outwardly.

Tube 52 is formed with at least one, and preferably three inwardly-facing ridges 58, as best seen in cross-section in FIG. 5. Ridges 58 have width 60 and extend inwards a depth 62 from interior surface 64 of tube 52. Ridges 58 are thus similar to ridges 26 of clip 10 as described above. The combination of a flower stem and ridges 58 results in gaps or channels between the stem and tube 52, similar to channels 32 formed by the combination of stem S and tube 12 illustrated in FIG. 2c. Ridges 58 may be approximately semicircular in cross-section and evenly spaced along the perimeter of tube 50, as illustrated in FIGS. 4 and 5, or some other form that is convenient to manufacture. It will be understood that clip 50 may be furnished with any desired number of ridges 58.

The wall of tube 52 has a thickness of approximately 0.004"–0.010" (0.10 mm–0.25 mm). Inner radius 66 of tube 52 is preferably about 0.1"–0.15" (2.5 mm–4.0 mm). Width 60 of ridges 58 is approximately 0.05"–0.1" (1.3 mm–2.5 mm), most preferably approximately 0.072" (0.5 mm). Depth 62 is in the range of approximately 0.02"–0.06" (0.5 mm–1.5 mm).

Opening 54 has width 68, in the range of approximately 0.1"–0.15" (2.5 mm–3.8 mm), preferably about 0.13" (3.3 mm). Ends 70a, 70b of flanges 56a, 56b are a distance 72 apart. Distance 72 is approximately 0.12"–0.20" (3.0 mm–5.1 mm), preferably about 0.16" (4.1 mm). It will be understood that distance 72 is greater than width 68, so that flanges 56a, 56b extend outwards at an angle from opening 54. The optimum length of flanges 20a, 20b varies depending on the dimensions of tube 52.

Clip 50, like clip 10, is made of a flexible, resilient material that provides longitudinal support against forces in the transverse direction. Clip 50 is preferably manufactured by extrusion molding, resulting in a low manufacturing cost. If desired, clip 50 may be tinted green to match the color of many flower stems.

As noted above, the stems of many flowers are foliage-free just below the flower head. The stems of roses, for example, typically are substantially free of foliage (leaves, thorns, branchlets, and so forth) for several inches just below the hip. To accommodate a wide variety of cut flowers, including most roses, clips 10 and 50 are preferably in the range of 3"–4.75" (approximately 7.6 cm–12.0 cm) long. Thus, on most roses, a clip 10 or 50 can readily be positioned just below the hip but above the closest foliage to the hip, that is, the first thorn, leaf, or branchlet. For other types of flower, a clip 10 or 50 can be likewise be placed on the stem, just below the base of the flower head and above the first foliage. The clips can readily be cut to measure if a shorter length is needed. Alternatively, the clips may be cut and packaged in longer lengths, such as sections 8" (about 20 cm) or 1' (about 30 cm) long and cut to measure when used.

Use of a clip according to the present invention extends the useful life of cut flowers—the useful life of some species of roses may be nearly doubled. The clip can be transparent or translucent, or tinted green to match the color of many flower stems, so it does not detract from the appearance of the flower. It provides mechanical support to the flower stem without damaging the stem or the flower. It can be easily and rapidly installed on a variety of cut flowers without damaging the stem, including but not limited to roses, carnations, and the like. It can be installed quickly because removing foliage or thorns from the stem is unnecessary.

It will be apparent to those skilled in the art that many changes and substitutions can be made to the preferred embodiment herein described without departing from the spirit and scope of the present invention as defined by the appended claims.

What is claimed is:

1. A device for supporting the stem of a flower, said device comprising:

a hollow tube having an interior surface defined by an axially extending central bore, said tube having an opening formed throughout the length thereof defining a longitudinal slot contiguous with said central bore said tube dimensioned to receive said stem, said opening being narrower than said stem;

at least one ridge formed on said interior surface along the length of said tube, said at least one ridge engaging said stem when said stem is in said tube and defining at least one channel between said stem and said interior surface; and means carried by said tube along longitudinal edges of said opening for guiding said stem into said tube, said stem engaging said guiding means and increasing the width of said opening as said stem is moved through said opening.

2. The device as recited in claim 1, wherein said opening is defined by two spaced apart edges of said tube and said guiding means further comprises a pair of flanges, one flange of said pair of flanges carried by each edge of said two edges.

3. The device as recited in claim 1, wherein said opening is defined by two spaced apart edges of said tube and said guiding means further comprises a pair of flanges, one flange of said pair of flanges carried by each edge of said two edges, said flanges being disposed at an angle with respect to one another, said angle being at least approximately 30°.

4. The device as recited in claim 1, wherein said tube has three spaced apart ridges formed on said interior surface, said ridges engaging said stem and defining three channels between said stem and said interior surface.

5. The device as recited in claim 1, wherein said flower has a flower head and said stem has first foliage at a distance from said flower head, and wherein said tube has a length, said length less than said distance.

6. The device as recited in claim 5, wherein said tube is less than approximately 4.75" (12.0 cm) long.

7. A device for supporting the stem of a flower, said device comprising:

a hollow tube dimensioned to receive said stem, said tube having an interior surface defined by an axially extending central bore, a length, and an opening formed throughout said length defining a longitudinal slot contiguous with said central bore and defined by two spaced apart edges; and means carried by said tube for forming channels between said stem and said interior surface when said stem is placed into said tube, said channel-forming means engaging said stem to form said channels when said stem is in said tube.

8. The device as recited in claim 7, wherein said channel-forming means further comprises at least one longitudinal, convex ridge formed on said interior surface.

9. The device as recited in claim 7, further comprising means carried by said tube at said opening for guiding said stem into said tube, said stem engaging said guiding means and increasing the width of said opening as said stem is moved through said opening.

10. The device as recited in claim 7, further comprising a pair of flanges carried by said tube at said opening for guiding said stem into said tube, one flange of said pair of flanges carried by each edge of said two edges, said flanges spreading as said stem engages said flanges and increases the width of said opening as said stem is moved through said opening.

11. The device as recited in claim 10, wherein said flanges are disposed at an angle with respect to each other, said angle being at least approximately 30°.

12. The device as recited in claim 7, wherein said flower has a flower head and said stem has first foliage at a distance from said flower head, and wherein said, said length of said tube is less than said distance.

13. The device as recited in claim 7, wherein said tube has a wall having a thickness in the range of approximately 0.004"–0.010" (0.10 mm–0.25 mm) thick, and an inner radius in the range of approximately 0.10"–0.15" (2.5 mm–4.0 mm).

* * * * *